US008541485B2

(12) United States Patent
Nelson et al.

(10) Patent No.: US 8,541,485 B2
(45) Date of Patent: Sep. 24, 2013

(54) PROCESS FOR MAKING FILLED RESINS

(75) Inventors: James M. Nelson, Woodbury, MN (US); Matthew N. Archibald, St. Paul, MN (US); Wendy L. Thompson, Roseville, MN (US); Jeremy A. Miller, Eagan, MN (US); Randy A. Larson, River Falls, WI (US); Terence D. Spawn, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 13/263,283

(22) PCT Filed: May 24, 2010

(86) PCT No.: PCT/US2010/035924
§ 371 (c)(1),
(2), (4) Date: Oct. 6, 2011

(87) PCT Pub. No.: WO2010/138440
PCT Pub. Date: Dec. 2, 2010

(65) Prior Publication Data
US 2012/0059086 A1    Mar. 8, 2012

Related U.S. Application Data

(60) Provisional application No. 61/181,052, filed on May 26, 2009.

(51) Int. Cl.
*C08J 3/205*  (2006.01)
*C08L 63/04*  (2006.01)
*C08L 21/00*  (2006.01)

(52) U.S. Cl.
USPC ............................. 523/340; 525/55; 525/523

(58) Field of Classification Search
USPC .................................. 523/340; 525/55, 523
See application file for complete search history.

(56) References Cited

U.S. PATENT DOCUMENTS 2,801,185 A    6/1957  Iler
3,018,262 A    1/1962  Schroeder (Continued)

FOREIGN PATENT DOCUMENTS

GB    904177    8/1962
JP    2009-041001    *  2/2009

(Continued)

OTHER PUBLICATIONS

Machine translation of JP 2009-041001. Feb. 2009.*

(Continued)

*Primary Examiner* — John Uselding
(74) *Attorney, Agent, or Firm* — Adam Bramwell; Douglas B. Little

(57) ABSTRACT

A method of making a filled resin includes the steps of: Providing a wiped film evaporator with an internal evaporator chamber maintained under vacuum and having an internal chamber wall maintained at an elevated temperature; introducing solvent-borne particles and organic matrix into the internal chamber; and compounding the solvent-borne particles and the organic matrix in the internal evaporator chamber by forming a thin film against the internal chamber wall, the thin film including organic matrix and particles, and the vacuum conditions and elevated temperature being sufficient to remove solvent from the particles and organic matrix to provide the filled resin. Less than about 10% of the particles in the resulting filled resin are agglomerated.

20 Claims, 5 Drawing Sheets

(56) References Cited

U.S. PATENT DOCUMENTS

| | | |
|---|---|---|
| 3,298,998 A | 1/1967 | Coover et al. |
| 3,562,223 A | 2/1971 | Bargain et al. |
| 3,627,780 A | 12/1971 | Bonnard et al. |
| 3,704,863 A | 12/1972 | Meyer et al. |
| 3,839,358 A | 10/1974 | Bargain |
| 4,046,734 A | 9/1977 | Zimmerli |
| 4,076,550 A | 2/1978 | Thurn et al. |
| 4,100,140 A | 7/1978 | Zahir et al. |
| 4,157,360 A | 6/1979 | Chung et al. |
| 4,468,497 A | 8/1984 | Beckley et al. |
| 4,522,958 A | 6/1985 | Das et al. |
| 6,149,850 A | 11/2000 | Gannon |
| 6,653,000 B2 | 11/2003 | Jinbo et al. |
| 6,713,534 B2 | 3/2004 | Goerl et al. |
| 7,514,263 B2 | 4/2009 | Nelson et al. |
| 7,691,932 B2 | 4/2010 | Nelson et al. |
| 2003/0220204 A1 | 11/2003 | Baran et al. |
| 2011/0028605 A1 | 2/2011 | Nelson et al. |
| 2011/0097212 A1 | 4/2011 | Thompson et al. |

FOREIGN PATENT DOCUMENTS

| | | |
|---|---|---|
| WO | WO 2009/011278 | 1/2009 |
| WO | WO 2009/120868 | 10/2009 |
| WO | WO 2010/080459 | 7/2010 |

OTHER PUBLICATIONS

U.S. Appl. No. 61/139,145, "Nanocalcite Composites", filed Dec. 17, 2009 published as WO2010/080459.

Handbook of Thermoset Plastics (Second Edition), William Andrew Publishing, 1998, p. 122.

Handbook of Epoxy Resins by Lee and Neville, McGraw-Hill Book Co., New York, 1967.

Epoxy Resins, Chemistry and Technology, Second Edition, edited by C. May, Marcel Dekker, Inc., New York, 1988.

* cited by examiner

PROCESS FOR MAKING FILLED RESINS

This application is a national stage entry of PCT/US2010/035924, filed May 24, 2010, which claims priority from Provisional Application 61/181,052, filed May 26, 2009.

The present invention relates to a process of making filled resins utilizing one or more wiped film evaporator(s).

BACKGROUND

Uncured polymeric materials that are reinforced with insoluble particles are generally referred to as "compounded resins" or "filled resins." One type of filled resin is a nanoparticle-filled resin which includes a particulate having one or more dimensions that are measured on a nanometer scale. When cured, the resulting "nanocomposites" may exhibit enhanced properties including electrical or thermal conductivity or enhanced optical properties or improved mechanical properties such as stiffness and strength, for example.

Product applications for nanocomposites and other filled resins typically require thorough mixing of the particles within the polymer matrix with minimal agglomeration. Often, functional groups are added to the surfaces of the particles to make them more compatible with the polymer matrix. However, a thoroughly mixed filled resin with low particle agglomeration is difficult to achieve with highly viscous polymers and/or where high particle loadings are desired. Moreover, the use of batch manufacturing processes for such filled resins can be labor intensive and expensive. Consequently, economic applications for filled resins, including nanocomposites, have been limited.

SUMMARY

The present invention addresses noted problems associated with the manufacture of filled resins.

In one aspect, the invention provides a process of making a filled resin, comprising:

Providing a wiped film evaporator comprising an internal evaporator chamber maintained under vacuum conditions and an internal chamber wall maintained at an elevated temperature;

Introducing solvent-borne particles and organic matrix into the internal chamber; and Compounding the solvent-borne particles and the organic matrix in the internal evaporator chamber by forming a thin film against the internal chamber wall, the thin film comprised of organic matrix and particles, the vacuum conditions and elevated temperature being sufficient to remove solvent from the particles and organic matrix to provide the filled resin;

Wherein, less than about 10% of the particles in the filled resin are agglomerated.

Various terms used herein to describe aspects of the present invention will be understood to have the same meaning known to persons of ordinary skill in the art. Certain terms will be understood to have the meaning set forth herein.

"Compounding" refers to forming by combining parts. In the context of making filled resins, compounding refers to forming a filled resin by thoroughly mixing organic matrix, particles and other ingredients, in the manner described herein.

"Filled resin" refers to particles in an organic matrix.

"Functionalized particle" refers to a particle that includes one or more surface groups present on the surface of the particle.

"Organic matrix" refers to a polymeric material(s) or polymer precursor(s) (e.g., monomeric or oligomeric material) to a polymeric material.

"Substantially homogenous" refers to a relatively uniform structure or composition throughout, and "substantially homogenously dispersed," in reference to particles in a filled resin refers to a substantially homogenous blend of particles and organic matrix with less than about 10% of the particles in the filled resin being agglomerated.

"Substantially symmetric," in reference to particles, refers to particles that are relatively symmetric in that the length, width and height measurements are substantially the same and the average aspect ratio of such particles is approximately 1.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used herein, the recitation of numerical ranges by endpoints includes all numbers subsumed within that range (e.g., 1 to 5 includes 1, 1.5, 2, 2.75, 3, 3.8, 4, and 5).

As included herein, the singular form of a noun that follows the indefinite article "a" or "an" is to be presumed to encompass the plural form of the noun unless the context clearly dictates otherwise.

BRIEF DESCRIPTION OF THE FIGURES

In describing embodiments of the invention, reference is made to the Figures in which components of the embodiments are identified with reference numerals and wherein like reference numerals indicate like components, and wherein.

It will be appreciated that the various Figures are not necessarily to scale but are presented as an aid to understanding the described embodiments. Those skilled in the art will better understand the features of the various embodiments upon consideration of the remainder of disclosure including the Detailed Description, the non-limiting Examples and the claims.

DETAILED DESCRIPTION

The present invention provides a process for making filled resins that include combining and compounding solvent-borne particles, organic matrix and other ingredients in a wiped film evaporator. In some embodiments, the process of the invention includes the surface treatment of untreated particles (e.g., by surface-modification) to provide functionalized particles and compounding the functionalized particles with organic matrix in a wiped film evaporator to provide a filled resin. In the various embodiments, the wiped film evaporator is operated under conditions that facilitate the removal of solvent and the thorough, rapid mixing of particles and organic matrix during the compounding step to provide a filled resin having a greatly reduced solvent level.

Wiped film evaporators are known for the processing of heat-sensitive, high-boiling, and viscous materials. Common operating features of wiped film evaporators include high-vacuum (short path) distillation, short residence time, and a highly agitated thin film of feed product on a heated surface. In the embodiments of the present invention, a wiped film evaporator is used as an effective means for the compounding of particles in an organic matrix (e.g., a polymeric resin). Surprisingly, the wiped film evaporator is capable of quickly and thoroughly mixing particulate materials (e.g., functionalized nanoparticles) in a resin while simultaneously removing solvent from the particulate/resin mixture to provide a filled resin having a low percentage of agglomerated particles and very little residual solvent. In some embodiments, more than one wiped film evaporator is used where, for example, additional solvent removal and/or further compounding is desired.

Figure 1:
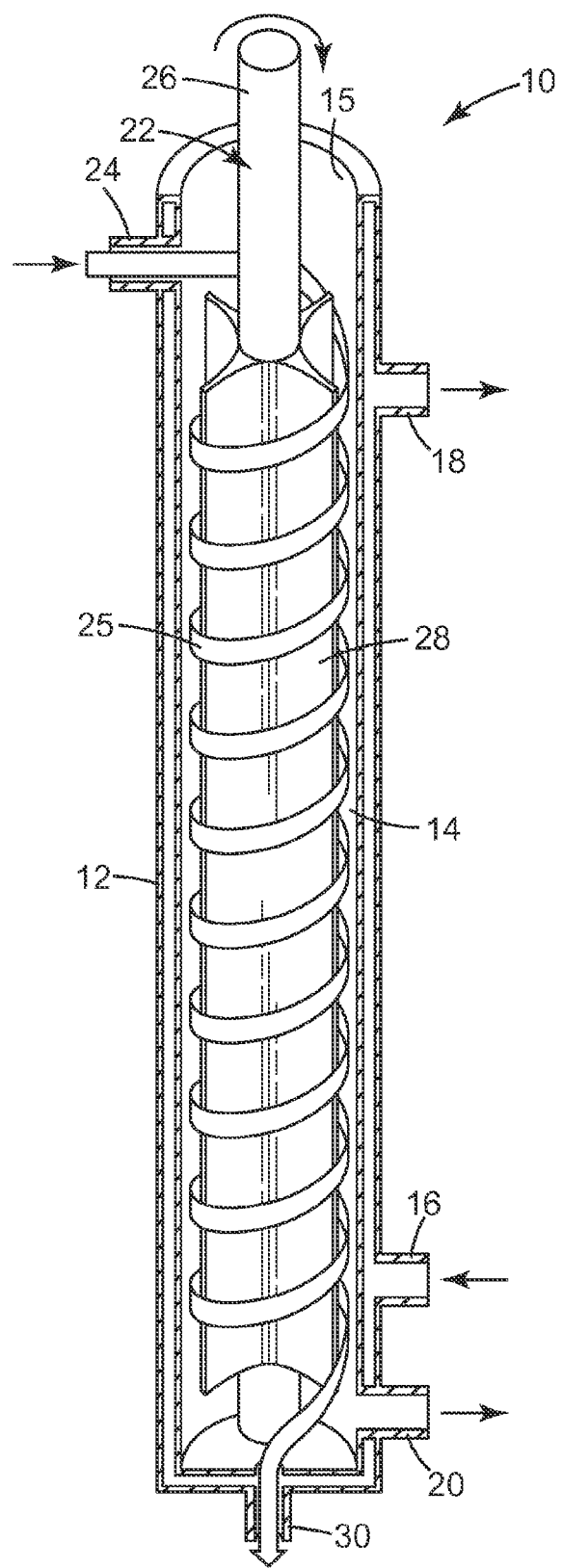
FIG. 1 is a side elevation, in cross section, of a wiped film evaporator of the type used in the various embodiments of the invention.

Referring to FIG. 1, an embodiment of a wiped film evaporator 10 is shown and will now be described. It will be appreciated that evaporator 10 is illustrative of such instruments, but the present invention is not limited to the use of a particular evaporator design. Evaporator 10 includes a cylindrical heating jacket 12 as a housing around internal evaporator chamber 14. Jacket 12 is constructed to accommodate the flow of a heating medium (e.g., steam, diathermic oil, etc.) that maintains the surface of the internal wall of chamber 14 at a constant temperature. In some embodiments of the invention, the temperature of the internal wall 15 of chamber 14 is maintained at an elevated to temperature to evaporate solvent from the feedstock of particles and organic matrix. The heating medium is first preheated and then directed (e.g., pumped) into jacket 12 through flow inlet 16. The heating medium circulates within the jacket 12 and exits through flow outlet 18. A vacuum is typically created within the internal chamber 14 to facilitate the removal of solvent, and vacuum outlet 20 is provided for connection to a vacuum pump or source (not shown). The vacuum outlet 20, while shown near the bottom of jacket 12, may be located near the top of the jacket or at any other suitable location. A drive motor (not shown) rotates the separator assembly 22 which extends throughout the internal chamber 14. The assembly 22 includes a rotatable drive shaft 26 and a plurality of wiper blades 28 mounted on the shaft. Feed inlet 24 is provided to introduce a feed, represented by ribbon 25, into internal chamber 14 of evaporator 10. For the sake of clearly showing the pathway of the feed through the internal chamber 14, the feed is represented by a narrow ribbon 25. It will be appreciated that the feed can, and typically does, form a continuous thin film of material along the internal wall 15 of chamber 14.

Feed 25 includes particles, solvent, organic matrix material and other ingredients, as described herein. The feed 25 enters the evaporator 10 through inlet 24 and is distributed onto the separator assembly 22. Wiper blades 28 distribute the feed 25 evenly along the internal wall 15 of chamber 14, forming a thin film of material that is quickly moved down the length of the chamber wall 15 by gravity and the mechanical action of the rotating wiper blades 28. Under vacuum conditions with the flow of a heating medium circulating within jacket 12, volatile compounds (e.g., liquid solvents) are evaporated from the feed 25 and are pumped out of internal chamber 14 through vacuum outlet 20. The resulting concentrate is a filled resin which is removed from the evaporator 10 through the distillate outlet 30.

In general, a wiped film evaporator is capable of compounding particles with polymer systems having viscosities of up to about 30,000 centipoise including thermosetting polymers, thermoplastic polymers, elastomers, and the like. Commercially available wiped film evaporators are useful in the embodiments of the present invention such as that available under the trade designation "Filmtruder" from Buss-SMS-Canzler, Butzbach Germany as well as that available from Pfaudler Engineered Systems (Rochester, N.Y.), for example. Suitable evaporators may also be custom made. As used herein, the term "wiped film evaporator" refers to any of a variety of evaporator technologies including rolled, thin, wiped, and fixed-clearance wiped film evaporators.

In an embodiment of the process of the present invention, one or more wiped film evaporator(s) can be included in a system that operates in a continuous mode to provide a filled resin. In such embodiments, untreated particles are first combined with surface-modifying agent and solvent and fed through a hydro-thermal reactor to form functionalized particles in an effluent that may include additional ingredients such as rubber nano-particles, co-solvent(s) and the like. Effluent is combined with organic matrix and directed into a wiped film evaporator where the solvent-borne functionalized particles are compounded with the organic matrix and solvent is removed as previously described.

Figure 2:
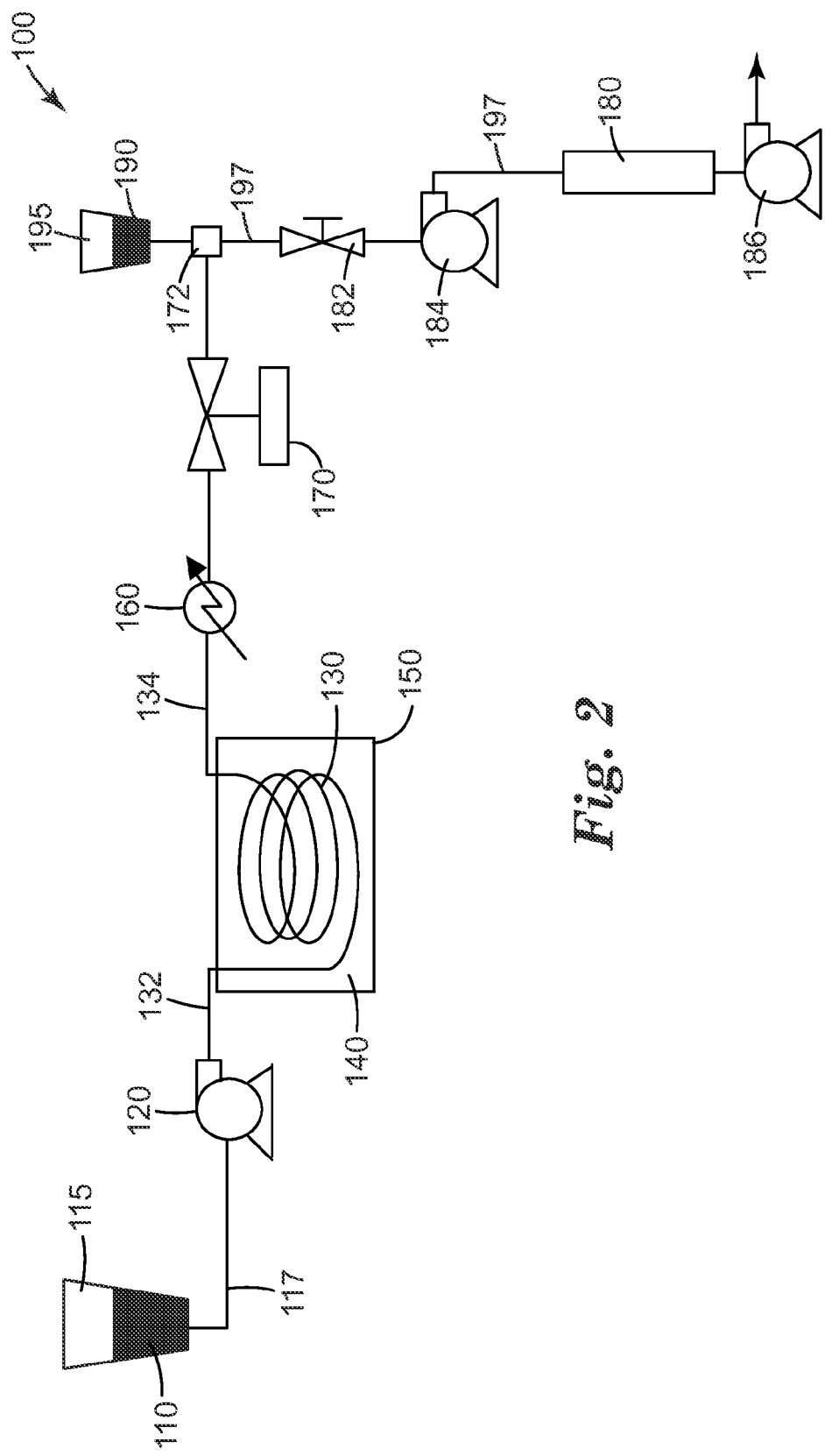
FIG. 2 is a schematic of a continuous manufacturing process according to an embodiment of the invention.

Referring to FIG. 2, a first embodiment of a system for performing a continuous process according to the invention is schematically illustrated and will now be described. The system 100 is capable of running in a continuous mode by generating solvent-borne functionalized particles, combining the particles with organic matrix to provide a mixture and thereafter compounding the mixture in a wiped film evaporator. Feed 110 comprises particles in a solvent. In some embodiments, the feed includes unreacted surface-modifying agent(s), unmodified or untreated particles and other optional components in solvent. In other embodiments, the feed comprises partially reacted surface-modifying agent(s), unmodified particles and possibly other optional components in solvent. As is mentioned herein, some surface-modifying agents may undergo hydrolysis and condensation reactions in attaching themselves to a particle. At least the hydrolysis reaction may be performed prior to mixing surface-modifying agent with particles in a feed.

Feed 110 is initially placed within feed tank 115 connected with tubing or piping 117 to pump 120. Piping 117 is constructed of a suitable (e.g., non-reactive) material such as polymeric or ceramic materials, for example. In some embodiments, the tubing or piping 117 can be polyethylene tubing or polypropylene tubing in the portions of the continuous hydrothermal reactor system 100 that are not heated and are not under high pressure. Pump 120 pumps feed 110 from feed tank 115 through piping 117 into inlet 132 of reactor 130. Pump 120 is of a type that can move feed against the elevated internal pressure within reactor 130. Under the control of pump 120, the flow of feed 110 into reactor 130 may be at a constant rate or it can be at a non-constant or pulsed flow rate.

Reactor 130 is shown as a coil of tubing (e.g., a tubular reactor), but alternative configurations may be used. The selection of a suitable shape for reactor 130 may be based on the desired length of the reactor and the means by which it is heated. For example, a suitable reactor can be straight, U-shaped, or coiled (e.g., as shown). Moreover, the interior portion (e.g., interior walls) of reactor 130 can be smooth or substantially flat or the reactor 130 can contain internal baffles, balls, or other structures for creating a turbulent flow environment to mix the feed components (e.g., particles, surface-modifying agent(s) and solvent) as they pass therethrough. In some embodiments, an interior surface of reactor 130 is lined or coated with a fluorinated polymer which can include, for example, a fluorinated polyolefin such as polytetrafluoroethylene ("PTFE"), commercially available under the trade designation "TEFLON" from DuPont (Wilmington, Del.). In fact, suitable reactors may be constructed with a hose comprised of a fluoropolymer, such as PTFE, contained within a metal housing such as a braided stainless steel tubing. In such a reactor, heat transfer through the fluorinated polymeric material is sufficient to convert the particles and surface-modifying agent(s) in the feedstock to functionalized particles. Fluorinated polymeric surface may be advantageously used with feedstock solutions and/or reaction products containing carboxylic acids to prevent the acids from leaching metals the internal surface of a hydrothermal reactor.

Reactor 130 is immersed in medium 140 contained within vessel 150. The medium 140 is capable of holding heat and maintaining an elevated temperature without degrading. Suitable materials for medium 140 include, for example, oil, sand or the like. In embodiments where a hydrolysable organosilane (e.g. trialkoxysilane) is used as a surface-modifying agent, medium 140 is heated to a temperature above the hydrolysis and condensation temperatures of the surface-modifying agent. Oils suitable for use as medium 140 include, for example, plant oils such as peanut oil and canola oil which may be kept under nitrogen to prevent or minimize the oxidation of the oil when heated. Other suitable oils include polydimethylsiloxanes such as those commercially available from Duratherm Extended Fluids (Lewiston, N.Y.) under the trade designation "DURATHERM S." Vessel 150 is capable of holding medium 140 and withstanding the elevated temperatures used to heat reactor 130. Vessel 150 can be heated using any suitable heat source such as, for example, induction heaters, fuel-fired heaters, heating tape, and steam coils.

In some embodiments, reactor 130 is constructed of a damage resistant material capable of withstanding exposure to severe or extreme conditions produced in the surface-modifying reaction. For example, in embodiments where organoacids are used as surface-modifying agents, carboxylic acids can be present in the feed 110 or can be produced as a byproduct of the functionalization reaction within the hydrothermal reactor system, and reactor 130 should be resistant to corrosion or other damage in the presence of such acids. In some embodiments, reactor 130 may be made of stainless steel, nickel, titanium, carbon-based steel, or the like. In some embodiments, reactor 130 can be provided as a plug flow stirred tubular reactor, as is described in U.S. Pat. No. 7,514,263 B2, issued Apr. 7, 2009, entitled "A Continuous Process for the Production of Combinatorial Libraries of Materials".

Medium 140 maintains feedstock within reactor 130 at a temperature above the normal boiling point of the feedstock solvent at an elevated pressure sufficient to prevent boiling of the medium. Feedstock is introduced into the heated zone of reactor 130 and effluent is thereafter removed from the heated zone of the reactor. The movement of feedstock into reactor 130 and removal of the effluent can be continuous or, in some embodiments, it can be intermittent (e.g., pulsed).

Outlet 134 of reactor 130 connects to a cooling device 160, which in some embodiments, is a heat exchanger that includes a section of tubing or piping with an outer jacket filled with a cooling medium such as chilled water. In other embodiments, cooling device 160 includes a coiled section of tubing or piping immersed in a vessel containing chilled water or the like. In either embodiment, the reactor effluent is passed through the section of tubing and is cooled so that the effluent from the temperature of reactor 130 is cooled to a temperature no greater than 100° C., in some embodiments no greater than 80° C., no greater than 60° C., no greater than 40° C. or no greater than 25° C. In some embodiments, the section of tubing is cooled to a temperature no greater than 10° C. Other cooling means can also be used such as dry ice or refrigeration coils, for example.

After cooling, the solvent-borne functionalized particles are routed into mixer 172 and are combined with organic matrix material 190 fed from tank 195 to form a mixture that is then routed from mixer 172 through line 197 and through valve 182 and to second pump 184 which pumps the mixture into wiped film evaporator 180. The solvent-borne particles are compounded with the organic matrix material within the wiped film evaporator 180 and solvent is simultaneously removed to provide a filled resin. A third pump 186 pumps the filled resin from the wiped film evaporator 180 and into a collection vessel or to another process station, for example.

Backpressure valve 170 is positioned between cooling device 160 and wiped film evaporator 180 to control pressure at the exit of hydrothermal reactor 130 and within the reactor 130. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). In some embodiments, the backpressure is greater than about 700 pounds per square inch (4.9 MPa). The backpressure is desirably high enough to prevent the boiling of solvent within reactor 130.

In conjunction with the flow rate of feedstock, the dimensions of reactor 130 can be varied to determine the feedstock residence times within the reactor, i.e., the average length of time that feedstock remains within the heated zone of reactor 130. The residence time can be calculated by dividing the reactor volume by the flow rate of the feedstock. In some embodiments, suitable residence times are those that are at least 2 minutes, at least 4 minutes, at least 6 minutes, at least 8 minutes, or at least 10 minutes. Suitable residence times are typically no greater than 4 hours, no greater than 2 hour, no greater than 90 minutes, no greater than 60 minutes, or no greater than 50 minutes. In some embodiments, the residence time can be in a range of 2 to 90 minutes, a range of 2 to 60 minutes, a range of 5 to 60 minutes, or a range of 5 to 50 minutes.

Any suitable length tubular reactor can be used provided that the residence time is sufficient to convert the feedstock to functionalized particles. In some embodiments, the reactor has a length of at least 0.5 meter, at least 1 meter, at least 2 meters, at least 5 meters, at least 10 meters, at least 15 meters, at least 20 meters, at least 30 meters, at least 40 meters, or at least 50 meters. Stated another way, the length of the tubular reactor in some embodiments is less than 1000 meters, less than 500 meters, less than 400 meters, less than 300 meters, less than 200 meters, less than 100 meters, less than 80 meters, less than 60 meters, less than 40 meters, or less than 20 meters.

In some embodiments, reactors with relatively small inner diameters are preferred. For example, reactors having an inner diameter no greater than about 3 centimeters can provide a relatively rapid heating rate. Also, the temperature gradient across the tubular reactor 130 is smaller for reactors with a smaller inner diameter as compared with reactors having a larger inner diameter. However, smaller diameters in reactor 130 can run the risk of becoming plugged during operation from the deposition of material on the walls of the reactor. In some embodiments, the inner diameter of reactor 130 is often at least 0.1 centimeters, at least 0.15 centimeters, at least 0.2 centimeters, at least 0.3 centimeters, at least 0.4 centimeters, at least 0.5 centimeters, or at least 0.6 centimeters. In some embodiments, the diameter of the tubular reactor 130 is no greater than 3 centimeters, no greater than 2.5 centimeters, no greater than 2 centimeters, no greater than 1.5 centimeters, or no greater than 1.0 centimeters. Some tubular reactors have an inner diameter in the range of 0.1 to 3.0 centimeters, in the range of 0.2 to 2.5 centimeters, in the range of 0.3 to 2 centimeters, in the range of 0.3 to 1.5 centimeters, or in the range of 0.3 to 1 centimeter.

In some embodiments, instead of increasing the inner diameter of reactor 130, multiple reactors may be employed wherein each reactor has a smaller inner diameter with two or more such reactors arranged in parallel. Tubular reactor 130 can be broken into two or more sections of tubing having different inner diameters and made of different materials. For example, a first section of tubing could be of smaller diameter relative to a second section to facilitate faster heating of the feedstock solution in the smaller diameter tubing prior to being held at the process temperature in the second section. In one embodiment, the first section of the tubular reactor 130 can be made of stainless steel tubing having an inner diameter of 1 centimeter, and the second section could be made of PTFE tubing contained within a stainless steel housing and having an inner diameter of 2 centimeters.

Typically, reactor 130 is held at a temperature greater than the hydrolysis and condensation reaction temperatures of the surface-modifying agent(s). In some embodiments, the temperature is at least 130° C., at least 140° C., or at least 150° C. The temperature is generally low enough to avoid an unacceptably high pressure within the reactor. In various embodiments, the temperature is typically no greater than 230° C., no greater then 225° C., or no greater than 220° C. In some embodiments, the reaction temperature is selected to be in the range of 130° C. to 230° C., in the range of 140° C. to 220° C., in the range of 140° C. to 200° C., in the range of 150° C. to 200° C., or in the range of 150° C. to 180° C.

In some embodiments (e.g., non-continuous processes), effluent from the hydrothermal reactor tube 130 may be collected in a separate vessel (not shown) prior to placement of the effluent in the wiped film evaporator 180. In such embodiments, at least a portion of the solvent in the effluent may be removed prior to mixing the functionalized particles with organic matrix. In some embodiments, effluent can be dried at an elevated temperature to facilitate the removal of the solvent.

In embodiments utilizing functionalized nanoparticles, compounding of such nanoparticles with an organic matrix results in a nanocomposite which may be expected to exhibit enhanced properties such as enhanced optical properties, dielectric properties, thermal properties or mechanical properties such as stiffness and strength. When the above described continuous manufacturing process is employed, the process is capable of providing significant cost savings by eliminating the need for isolating functionalized nanoparticles prior to dispersing the functionalized particles in an organic matrix. The aforementioned continuous process takes place in a closed system, thus avoiding the need to handle dry nanoparticles. Additionally, the plug flow nature of reactor 130 allows for nanocomposite formation with particle loadings that can be varied in a combinatorial fashion.

Figure 3:
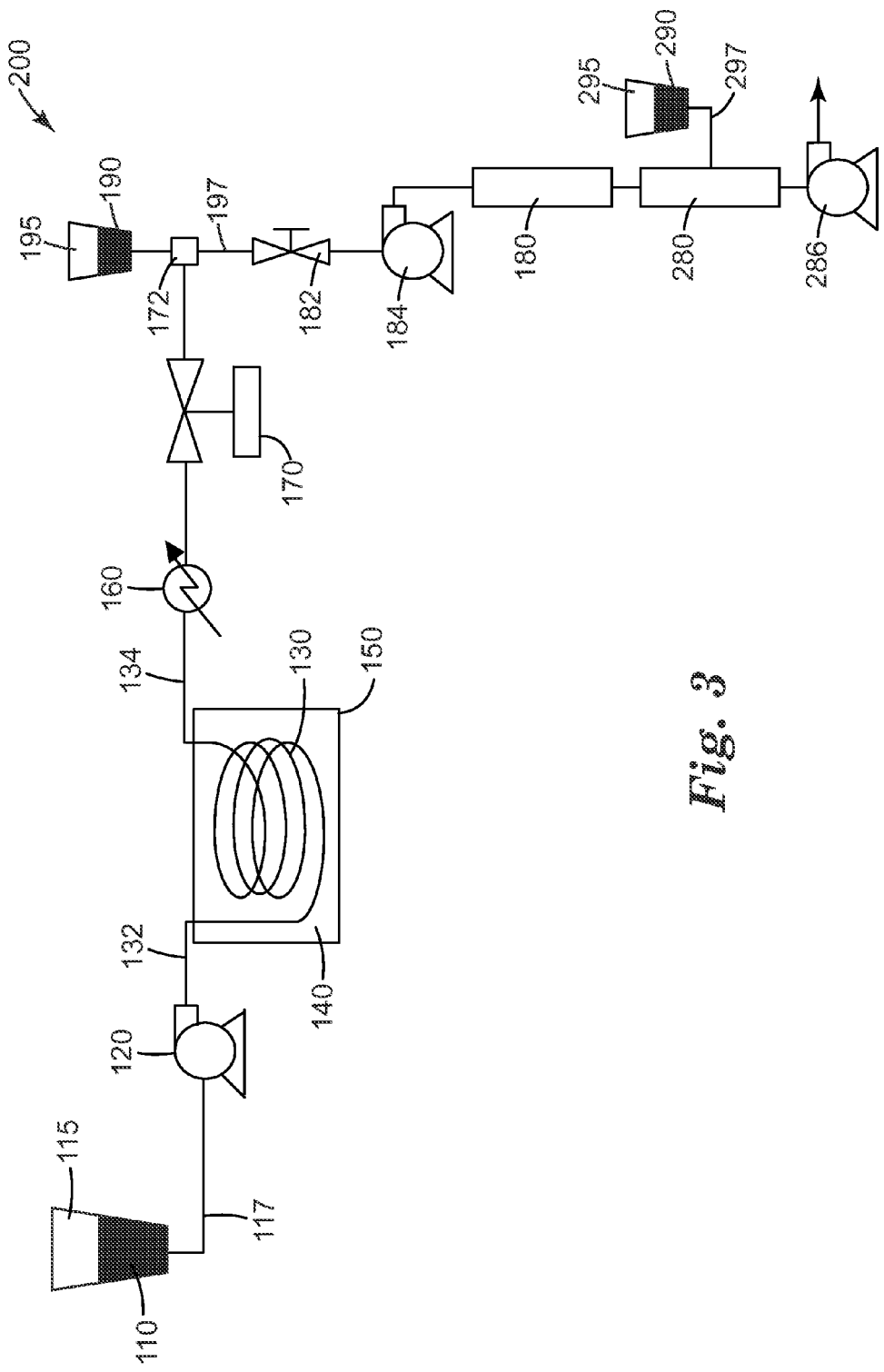
FIG. 3 is a schematic of a continuous manufacturing process according to another embodiment of the invention.

Referring to FIG. 3, another embodiment of a continuous system for performing the process of the invention is shown in schematic and will now be described. The system 200 is similar in many respects with the previously described system 100, and, as may be indicated by the use of common reference numerals, features of the system 200 are the same as (or equivalent to) those shown in system 100 (FIG. 2). In addition to the previously described features, system 200 includes a second wiped film evaporator 280 connected to wiped film evaporator 180 through flow line 282. Filled resin from the wiped film evaporator 180 is directed through line 282 and into the second evaporator 280. A second organic matrix material 290 (e.g., a second polymer, monomer and/or oligomer) may be fed into the evaporator 280 from tank 295 through line 297. Second organic matrix material 290 typically does not include particles and is routed into wiped film evaporator 280 and compounded with the nanocomposite resin from wiped film evaporator 180 to thereby dilute or "let down" the overall nanoparticle concentration in the final filled resin. A third pump 286 pumps the filled resin from the wiped film evaporator 280 and into a collection vessel or to another process station, for example.

As described above with respect to the embodiments shown in FIGS. 1 and 2, the wiped film evaporator provides a mixing environment that includes vacuum or partial vacuum conditions at an elevated temperature to facilitate the removal of liquids (e.g., solvents). The wiped film evaporator also provides a means to disperse a high loading of particles in an organic matrix in a manner that results in a filled resin with low particle agglomeration and little retained solvent. In some embodiments, the level of particle agglomeration in the final resin is less than about 10% agglomeration at a particle loading of at least about 20% by weight based on the total weight of the filled resin. As known by those skilled in the art, the level of particle agglomeration may be determined by SEM inspection of a finished resin through statistical analysis of area plots in a micrograph to determine the particle size distribution.

The process of the invention provides filled resins made from a variety of components which will now be described.

Filled resins include particles in an organic matrix. A non-limiting listing of suitable particulate materials is provided below. However, other known but unlisted materials are considered within the scope of the present disclosure. Likewise, presently unforeseen materials may subsequently be synthesized and are also to be considered within the scope of the invention.

In some embodiments of the invention, useful particles may be substantially symmetric. By way of example, substantially symmetric particles include those that are substantially spherical, substantially cubic, or the like. In some embodiments, useful particles may not be symmetric in all three spatial measurements.

In some embodiments, useful particles are relatively uniform in size and are non-aggregating when included in a sol. Such particles can be provided in any of a number of sizes depending on the desired use of the resulting filled resin so long as the particle can be compounded with organic matrix in a wiped film evaporator. In some embodiments, the particles are microparticles in that they have an average thickness (e.g., length, width and/or height) of one micrometer or greater. In some embodiments, the particles have an average thickness up to about 30 micrometers. In some embodiments, the particles are nanoparticles in that they have an average thickness less than about one micrometer, in some embodiments less than about 500 nm, less than about 100 nm, or less than about 50 nm.

In some embodiments, the process of the invention provides filled resins that comprise a high concentration of particles, and in some embodiments, a filled resin maybe prepared to include more than one type of particle (e.g., combinations of particles made of different materials and/or combinations of particles having different average particle sizes). In some embodiments, filled resins may be prepared to include particles comprising nanoparticles, and the nanoparticles that are present in the filled resin at a concentration of at least about 20% by weight. In some embodiments, useful nanoparticles may be used to provide a finished resin having a concentration of nanoparticles of at least about 30% by weight, in some embodiments at least about 40% by weight, in some embodiments at least about 50% by weight, at least about 60% by weight, at least about 65% by weight, at least about 70% by weight or at least about 75% by weight. In some embodiments, nanoparticles are present in the finished resin at a concentration no greater than about 80% by weight, no greater than about 70% by weight, no greater than about 65% by weight, no greater than about 60% by weight, no greater than about 50% by weight, no greater than about 40% by weight, no greater than about 30% by weight.

In embodiments of the invention utilizing inorganic particles, the particles may include metal particles such as, for example, particles of gold, platinum, silver, nickel and combinations of two or more of the foregoing.

In some embodiments, organic particles such as carbon black and organic pigments are useful in the process of the invention. Inorganic pigments may also be used such as red iron oxide, yellow 763ED (Pb chromate), green $Co(Al,Cr)_2O_4$, sodium alumino sulphosilicate (ultramarine blue), strontium carbonate, zinc phosphate, magnesium carbonate hydroxide and combinations of two or more of the foregoing.

Inorganic oxides may be suitable for use in the process of the invention. Suitable oxides include zirconium dioxide—$ZrO_2$, aluminum oxide—$Al_2O_3$, cerium (IV) oxide—$CeO_2$, titanium dioxide—$TiO_2$, iron(II) oxide—FeO, iron(II,III) oxide—$Fe_3O_4$, iron(III) oxide—$Fe_2O_3$, zinc oxide—ZnO, silicon dioxide (silica)—$SiO_2$, antimony trioxide—$Sb_2O_3$, boron oxide—$B_2O_3$, boron suboxide—$B_6O$, bismuth(III) oxide—$Bi_2O_3$, copper(I) oxide—$Cu_2O$, copper(II) oxide—CuO, chromium(III) oxide—$Cr_2O_3$, iron(II) oxide—FeO, iron (III) oxide—$Fe_2O_3$, magnesium oxide—MgO, manganese(IV) oxide (manganese dioxide—$MnO_2$).

In some embodiments, suitable particles include particles of inorganic sulfides which can include without limitation copper(I) sulfide—$Cu_2S$, copper(II) sulfide—CuS and zinc sulfide—ZnS. In some embodiments, suitable particles include particles of indium phosphide, aluminum phosphide, brass, metal coated glass, boron carbide—$B_4C$, boron nitride—BN, calcium carbide—$CaC_2$, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate—$LiNO_3$, lithium sulfate—$Li_2SO_4$, magnesium carbonate—$MgCO_3$, magnesium phosphate—$Mg_3(PO_4)_2$, magnesium sulfate—$MgSO_4$, manganese(II) sulfate monohydrate—$MnSO_4.H_2O$, manganese(II) phosphate—$Mn_3(PO_4)_2$, nickel(II) carbonate—$NiCO_3$, nickel(II) hydroxide—$Ni(OH)_2$, nickel(II) nitrate—$Ni(NO_3)_2$, silicon dioxide—$SiO_2$, titanium dioxide (titanium(IV) oxide)—$TiO_2$, zinc carbonate—$ZnCO_3$, zinc oxide—ZnO, zinc sulfate—$ZnSO_4$.

In certain embodiments, the particles comprise silicon dioxide ($SiO_2$ or "silica"). Suitable silicon dioxide particles can be provided as nanoparticles or as microparticles. In some embodiments, silicon dioxide particles are solid particles (e.g., not hollow). In some embodiments, silicon dioxide particles can be provided as hollow glass microspheres. In other embodiments, silicon dioxide particles can be provided as solid (e.g., not hollow) glass beads. In some embodiments, colloidal silica is preferred.

Other colloidal metal oxides can be utilized such as colloidal titania, colloidal alumina, colloidal zirconia, colloidal vanadia, colloidal chromia, colloidal iron oxide, colloidal antimony oxide, colloidal tin oxide, colloidal cerium oxide and mixtures of two or more of the foregoing. Suitable colloidal particles can comprise essentially a single oxide such as silica or can comprise a core of an oxide of one type over which is deposited an oxide of another type. In some embodiments, a suitable colloidal particle comprises a core of a material other than a metal oxide over which is deposited a metal oxide. The colloidal microparticles or nanoparticles may be relatively uniform in size and remain substantially non-aggregated in order to avoid aggregation, precipitation, gellation, or a dramatic increase in sol viscosity. In some embodiments, a particularly desirable class of particles for use in the invention includes sols of inorganic particles (e.g., colloidal dispersions of inorganic particles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., U.S. Pat. Nos. 2,801,185 (Iler) and 4,522,958 (Das et al.) See also, R. K. Iler, The Chemistry of Silica, John Wiley & Sons, New York (1979).

Suitable silica hydrosols are commercially available in a variety of particle sizes and concentrations such as those available from, e.g., Ondeo Nalco Chemical Company of Naperville, Ill. under the trade designations "Nalco 2329" and "Nalco 2327." Another source of a suitable silica sol is commercially available under the trade designation "Nissan MP2040" from Nissan Chemical America Corporation of Houston, Tex. Silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other processes of preparing silica hydrosols are known, e.g., electrodialysis, ion exchange of sodium silicate, hydrolysis of silicon compounds, and dissolution of elemental silicon.

Calcite is the crystalline form of calcium carbonate and typically forms rhombohedral crystals. In some embodiments of the invention, filled resins are made to incorporate calcite nanoparticles. Calcite nanoparticles may be surface-modified, and suitable surface modified calcite nanoparticles include those described in U.S. Provisional Pat. Application Ser. No. 61/139,145, entitled "Nanocalcite Composites". Surface-modified calcite nanoparticles comprise calcite cores and a surface-modifying agent bonded to the calcite. In some embodiments, at least 70%, e.g., at least 75% of the calcite cores have an average size of less than 400 nm. In some embodiments, at least 90%, in some embodiments, at least 95%, or even at least 98% of the calcite cores have an average size of less than 400 nm. In some embodiments, for example when using the nanocalcite containing resins to produce fibrous composites, it may be desirable to control, e.g., minimize or even eliminate, filtering of the nanocalcite by the fibers. Larger particles or particle aggregates may be filtered or separated from the resin while the mixture is pressed through a highly compressed fiber array in the process of making a continuous fiber composite.

In embodiments of the present invention, a feedstock is prepared by combining particles with surface-modifying agent, typically in a sol. The process of the invention provides functionalized particles that are compatible with an organic matrix material such as an organic polymer.

Generally, useful surface-modifying agents include at least a binding group and a compatibilizing segment:

Com. Seg.–Binding Group;

wherein "Com. Seg." refers to the compatibilizing segment of the surface-modifying agent. The compatibilizing segment improves the compatibility of the particles with the organic matrix, and the selection of a suitable compatibilizing group can depend on factors that include the nature of the organic matrix, the concentration of the particles, and the desired degree of compatibility.

The binding group bonds to the surface of the particle, connecting the surface-modifying agent to the particle. The nature of the bond between the particles and the binding groups can depend on the nature of the particles and the specific surface-modifying agents being used. In some embodiments, the surface-modifying agents are covalently bonded to the particles. In other embodiments, the surface-modifying agents are ionically bonded to the particles.

In some embodiments, surface-modifying agent includes a reactive group, i.e., a group capable of reacting with the organic matrix, (e.g., during the curing process). This can result in the particle being strongly bonded into the organic matrix. Generally, the reactive group is selected based on the nature of the organic matrix. In some embodiments, the reactive group may be located on the end of the compatibilizing segment:

Rx. Group–Com. Seg.–Binding Group wherein "Rx. Group" is the reactive group. In some embodiments, the reactive group may be located along the backbone of or pendant to the backbone of the compatibilizing segment. In some embodiments, the reactive group may be located between the compatibilizing segment and the binding group:

Com. Seg.–Rx. Group–Binding Group.

In some embodiments, a linking group connects the compatibilizing segment with the binding group:

Com. Seg.–Linking Group–Binding Group.

Suitable surface-modifying agents include without limitation organosilanes, organotitanates, organozirconates, organoacids, organoamines, organothiols, phosphinic acids and combinations thereof. In applications where the particles comprise colloidal silicon dioxide, zirconium oxide, titanium dioxide, the concentration of particles in the sol is typically between about 60% and about 20% by weight, in some embodiments between 55% and 30% by weight, in some embodiments between about 35% and 45% by weight.

Additionally, mixtures of particles that differ in particle size may be functionalized and incorporated into a single resin according to the invention. Examples of some suitable combinations of particle sizes include mixtures of particles having a thickness of about 20 nm with other larger particles such as those having a thickness of about 142 nm. Additionally, 20 nm particles may be combined with 200 nm particles, and 20 nm particles with 500 nm particles. Suitable weight ratios of the foregoing combined particle sizes can be within a wide range, in some embodiments between 1/20 and 20/1.

In embodiments of the invention, reactive groups (e.g., hydroxyl groups) on the surface of the particles are utilized to interact with surface-modifying agent(s) to form functionalized particles. In certain embodiments, reactive groups (e.g., hydroxyl groups) on the surface of the particles covalently bond with surface-modifying agent(s). In some embodiments, reactive groups on the surface of the particles ionically bond with surface-modifying agent(s). In embodiments of the invention utilizing oxide particles (e.g., silicon dioxide, titanium dioxide, zirconium dioxide, etc. . . . ), suitable surface-modifying agents include those that are reactive with the hydroxyl groups along the surface of the particles. In some embodiments, suitable surface-modifying agents include organosilanes. In some embodiments, suitable organosilanes include one organic substituent and three hydrolysable substituents. Exemplary organosilanes include: [2-(3-cyclohexenyl)ethyl]trimethoxysilane, trimethoxy(7-octen-1-yl)silane, isooctyl trimethoxy-silane, N-(3-triethoxysilylpropyl) methoxyethoxyethoxyethyl carbamate, N-(3-triethoxysilylpropyl)methoxyethoxyethoxyethyl carbamate, 3-(methacryloyloxy)propyltrimethoxysilane, allyl trimethoxysilane, 3-acryloxypropyltrimethoxysilane, 3-(methacryloyloxy)-propyltriethoxysilane, 3-(methacryloyloxy) propylmethyldimethoxysilane, 3-acryloyloxypropyl) methyldimethoxysilane, -9-3-(methacryloyloxy)-propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, isooctyltrimethoxysilane octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltrisisobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, heptamethyl(2-[tris(2-methoxyethoxy)-silyl]ethyl)trisiloxane (e.g., as described in published application US 2003/0220204 A1) polydimethylsiloxane, arylsilanes, including, e.g., substituted and unsubstituted arylsilanes, alkylsilanes, including, e.g., substituted and unsubstituted alkyl silanes, including, e.g., methoxy and hydroxy substituted alkyl silanes, and combinations of two or more of the foregoing.

Suitable surface treatments for silica particle inclusion in polyurethane environments can be produced by reaction of suitable di or trifunctional polyols with 3-triethoxysilyl propyl isocyanate, resulting in urethane linkages. Suitable polyols include polyethylene glycol, polypropylene glycol, polycaprolactone polyol (Tone 2221, available from Dow Chemical, Midland Mich.), hydroxyl-terminated polybutadienes and poly(tetramethylene ether) glycol.

Other surface-modifying agents suitable for use with oxide particles include acrylic acid, methacrylic acid, oleic acid, stearic acid, dodecanoic acid, 2-[2-(2-methoxyethoxy) ethoxy]acetic acid (MEEAA), betacarboxyethylacrylate, 2-(2-methoxyethoxy)acetic acid, methoxyphenyl acetic acid, and combinations of two or more of the foregoing. In some embodiments, a proprietary silane surface modifier identified by the trade name "Silquest A1230" (commercially available from Momentive Specialties of Wilton, Conn.), may be used.

In some embodiments, suitable surface-modifying agents include alkyl amines and/or aryl amines. In certain embodiments, surface-modifying agents comprising $C_1$-$C_{30}$ alkyl and aryl amines may be used, particularly polyethylene glycol-functional amines (e.g., jeffamine materials), stearyl amine, behenyl amine, and combinations thereof. In other embodiments, suitable surface-modifying agents include those comprising thiols and, in particular, $C_1$-$C_{30}$ alkyl and aryl thiols. In other embodiments, surface-modifying agents comprising carboxylic acids may be desired, particularly those comprising $C_1$-$C_{30}$ alkyl and aryl carboxylic acids. In still other embodiments, surface-modifying agents comprising phosphinic acids may be desired, particularly those comprising $C_1$-$C_{30}$ alkyl and aryl phosphinic acids.

In embodiments wherein water is used as the principal solvent, organic co-solvent may optionally be added to the sol to facilitate the solubility of the surface-modifying agent as well as the functionalized particles. Suitable co-solvents comprise any of a variety of water miscible organic solvents. In some embodiments, co-solvent(s) may be selected from the group that includes, for example, 1-methoxy-2-propanol, ethanol, isopropanol, ethylene glycol, N,N-dimethylacetamide, ethyl acetate, and/or 1-methyl-2-pyrrolidinone, dimethyl formamide, diethylene glycol dimethyl ether (diglyme), methanol, methoxy(ethoxy(ethoxy))ethanol as well as mixtures of two or more of the foregoing.

Carbonaceous particles such as carbon black may be surface treated in solvents such as toluene, benzene or ethyl benzene. In some embodiments, particle concentrations for such carbonaceous particles is within the range from about 5% to about 25 wt % with loadings of surface-modifying agent in the range from about 0.05% to about 0.1 wt %. In some embodiments, surface-modifying agents are selected from zirconates, titanates and organic aryl/alkylamines as well as combinations thereof.

Where calcite nanoparticles are used, they are surface treated with surface-modifying agents that include a binding group and a compatibilizing segment. In the preparation of calcite-containing filled resins in which the organic matrix is an epoxy resin system, useful compatibilizing segments include polyalkylene oxides, e.g., polypropylene oxide, polyethylene oxide, and combinations thereof. Unlike many silica-based nanoparticle systems wherein the surface-modifying agents are typically covalently bonded to the silica, surface-modifying agents useful with calcite nanoparticles are typically ionically bonded to (e.g., associated with) the calcite. In order to retain the surface-modifying agents with the calcite cores during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid, e.g., surface-functionalizing agents having a formula:

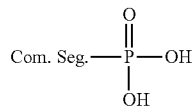

In some embodiments, the binding group comprises a sulfonic acid, e.g., surface-functionalizing agents having a formula:

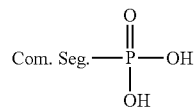

In some embodiments, the surface-modifying agent also comprises a reactive group—"Rx. Group" as discussed above—capable of reacting with the curable resin during a curing process. This can result in the nanocalcite particle being strongly bonded into the organic matrix. In some embodiments, the reactive group is located on the end of the compatibilizing segment. In some embodiments, the reactive group may be located along the backbone of or pendant to the backbone of the compatibilizing segment. In some embodiments, the reactive group may be located between the compatibilizing segment and the binding group. In some embodiments, a linking group is present which connects the compatibilizing segment with the binding group. For example, in some embodiments, the surface-modifying agent for nanocalcite is a polyetheramine. Exemplary polyetheramines include those available under the trade name JEFFAMINE® available from Huntsman Corporation, The Woodlands, Tex. In such embodiments, polyether serves as a compatiblizing segment, while the amine is the linking group linking the compatiblizing segment with the binding group.

In some embodiments, the calcite surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

In some embodiments, the process of the invention provides filled resins comprised of organic matrix, surface modified nanoparticles, and rubber nano-domains. Such filled resins are described in U.S. Provisional Pat. Application Ser. No. 61/061,795, entitled "Toughened Curable Compositions". In certain embodiments, rubber nano-domains comprise core-shell rubber nanoparticles. Useful core-shell rubber nanoparticles may include a shell made of material having a glass transition temperature of at least 50° C. and a core made of material having a glass transition temperature of no greater than −20° C. In some embodiments, the shell material is selected from acrylic polymer, acrylic copolymer, styrenic polymer, and styrenic copolymer. In some embodiments, the core material is selected from acrylic rubber and diene rubber. Combinations of two or more core and/or shell materials are also contemplated.

In some embodiments, useful rubber nano-domains comprise self-assembling, block copolymers, e.g., triblock copolymers.

In embodiments that utilize rubber nano-particles, the filled resin may include 20% to 50% by weight surface modified nanoparticles based on the total weight of the filled resin (e.g., organic matrix, surface modified nanoparticles, and the core shell rubber nanoparticles). In some embodiments, the filled resin includes 0.5% to 10% by weight rubber nano-domains based on the total weight of the organic matrix, the surface modified nanoparticles, and the rubber nano-domains.

Generally, the average size of useful rubber nano-domains is less than 500 nm, e.g., less than 300 nm, less than 200 nm, less than 100 nm, or even less than 50 nm. In some embodiments, the nano-domains comprise core shell rubber particles having an average particle size of less than 500 nm, e.g., less than 300 nm, less than 200 nm, less than 100 nm, or even less than 50 nm. In some embodiments, the rubber nano-domains have an average size of 10 nm.

In some embodiments, the curable resin systems of the present disclosure contain at least 0.5%, in some embodiments, at least 1%, in some embodiments, and, in some embodiments, at least 2% by weight of the rubber nano-domains based on the total weight of the curable rein(s), surface modified nanoparticles, and rubber nano-domains. In some embodiments, the curable resin systems of the present disclosure contain no greater than 10%, in some embodiments, no greater than 7%, and, in some embodiments, no greater than 5% by weight of the rubber nano-domains based on the total weight of the curable rein(s), surface modified nanoparticles, and rubber nano-domains.

As discussed herein, particles are combined with organic matrix to provide a filled resin. In some embodiments, the organic matrix is molten or uncured and is provided as a viscous liquid or semi-solid material capable of being hardened (e.g., cured). In various embodiments, the organic matrix comprises at least one polymer, oligomer and/or polymerizable monomer so that processing of the filled resin can include a polymerization step in which the polymer, oligomer and/or monomer undergoes one or more polymerization reaction(s). Suitable polymers include thermosetting polymers, thermoplastic polymers, elastomers, and the like.

In some embodiments, the organic matrix is an ethylenically-unsaturated crosslinkable resin such as, for example, unsaturated polyester resin, vinyl esters, and acrylates (e.g., urethane acrylates). As used herein, "vinyl ester" refers to the reaction product of epoxy resin(s) with ethylenically-unsaturated monocarboxylic acid(s). Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998)).

Initially, the molecular weight of the resin may be sufficiently low so as to be soluble in a reactive diluent. In some embodiments, an unsaturated polyester resin may be used. In some embodiments, the unsaturated polyester resin is the condensation product of one or more carboxylic acids or derivatives thereof (e.g., anhydrides and esters) with one or more alcohols.

Useful carboxylic acids may be unsaturated or saturated, and one or more of the carboxylic acids may be aromatic carboxylic acid. In some embodiments, combinations of saturated, unsaturated and/or aromatic carboxylic acid(s) may be used. Exemplary unsaturated carboxylic acids include acrylic acid, chloromaleic acid, citraconic acid, fumaric acid, itaconic acid, maleic acid, mesaconic acid, methacrylic acid, methyleneglutaric acid and combinations of two or more of the foregoing. Exemplary saturated or aromatic carboxylic acids include adipic acid, benzoic acid, chlorendic acid, dihydrophthalic acid, dimethyl-2,6-naphthenic dicarboxylic acid, d-methylglutaric acid, dodecanedicarboxylic acid, ethylhexanoic acid, glutaric acid, hexahydrophthalic acid, isophthalic acid, nadic anhydride o-phthalic acid, phthalic acid, pimelic acid, propionic acid, sebacic acid, succinic acid, terephthalic acid, tetrachlorophthalic acid, tetrahydrophthalic acid, trimellitic acid, 1,2,4,5-benzenetetracarboxylic acid, 1,2,4-benzenetricarboxylic acid, 1,2-cyclohexane dicarboxylic acid, 1,3 cyclohexane dicarboxylic acid, 1,4-cyclohexane dicarboxylic acid, dicyclopentadiene acid maleate, Diels-Alder adducts made from maleic anhydride and cyclopentadiene, orthophthalic acid and combinations of two or more of the foregoing.

Useful alcohols include polyhydric alcohol, e.g., a dihydric alcohol. Exemplary polyhydric alcohols include alkanediols, butane-1,4-diol, cyclohexane-1,2-diol, cyclohexane dimethanol, diethyleneglycol, dipentaerythritol, di-trimethylolpropane, ethylene glycol, hexane-1,6-diol, neopentyl glycol, oxa-alkanediols, polyethyleneglycol, propane-3-diol, propylene glycol, triethyleneglycol, trimethylolpropane, tripentaerythirol, 1,2-propyleneglycol, 1,3-butyleneglycol, 2-methyl-1,3-propanediol, 2,2,4-trimethyl-1-3,-pentanediol, 2,2-bis(p-hydroxycyclohexyl)-propane, 2,2-dimethylheptanediol, 2,2-dimethyloctanediol, 2,2-dimethylpropane-1,3-diol, 2,3-norborene diol, 2-butyl-2-ethyl-1,3-propanediol, 5-norborene-2,2-dimethylol, and 2,3 dimethyl 1,4 butanediol.

Monofunctional alcohols may also be used such as benzyl alcohol, cyclohexanol, 2-ethylhexyl alcohol, 2-cyclohexyl alcohol, 2,2-dimethyl-1-propanol, and lauryl alcohol. Combinations of two or more of the foregoing are also contemplated.

In certain embodiments, carboxylic acid is selected from the group consisting of isophthalic acid, orthophthalic acid, maleic acid, fumaric acid, esters and anhydrides thereof, and combinations thereof. In certain embodiments, alcohol is selected from the group consisting of neopentyl glycol, propylene glycol, ethylene glycol, diethylene glycol, 2-methyl-1,3-propane diol, and combinations thereof.

Organic matrix materials may include other resins. Suitable resins include epoxy resins, curable imide resins (e.g., maleimide resins). Commercially available polyimides include K-3 polyimides (available from DuPont). Other suitable polyimides include those having a terminal reactive group such as acetylene, diacetylene, phenylethynyl, norbornene, nadimide, or benzocyclobutane. Other suitable resins include vinyl ester resins and acrylic resins (e.g., (meth) acrylic esters or amides of polyols, epoxies, and amines), bisbenzocyclobutane resins, polycyanate ester resins, and mixtures thereof.

Epoxy resins may be useful due to their processing characteristics, high temperature properties, and environmental resistance. Epoxy compounds can be saturated or unsaturated, aliphatic, alicyclic, aromatic, or heterocyclic, or can comprise combinations thereof. In some embodiments, useful compounds include those containing more than one epoxy group (i.e., polyepoxides) and include both aliphatic and aromatic polyepoxides containing at least one aromatic ring structure, e.g. a benzene ring, and more than one epoxy group. Suitable aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. Polyglycidyl ethers of polyhydric phenols are commercially available such as bisphenol A diglycidyl ether available under the trade designation "EPON 828," commercially available from Miller-Stephenson Products of Danbury, Conn.

Useful aliphatic polyepoxides include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3", 4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1, 2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Useful aromatic polyepoxides include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 (Schoeder) and 3,298,998 (Coover et al.), as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A suitable class of polyglycidyl ethers of polyhydric phenols are the diglycidyl ethers of bisphenol that have pendant carbocyclic groups, e.g., those described in U.S. Pat. No. 3,298,998 (Coover et al.) Examples of such compounds include 2,2-bis[4-(2,3-epoxypropoxy)phenyl]norcamphane, 2,2-bis[4-(2,3-epoxypropoxy)phenyl]decahydro-1,4,5,8-dimethanonaphthalene and 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), as well as by other methods described by Lee and Neville and by May, supra.

Suitable maleimide resins include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. Nos. 3,562,223 (Bargain et al.), 3,627,780 (Bonnard et al.), 3,839,358 (Bargain), and 4,468,497 (Beckley et al.) Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a variety of unsaturated organic compounds, particularly those having multiple unsaturation, either ethylenic, acetylenic, or both. Examples include acrylic acids and amides and the ester derivatives thereof, e.g, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; a-methyl styrene; chlorostyrene; p-phenylstyrene; p-methylstyrene; t-butylstyrene; and phenyl vinyl ether. Resin systems employing a bismaleimide in combination with a bis(alkenylphenol) are useful, and descriptions of resin systems of this type are found in U.S. Pat. No. 4,100,140 (Zahir et al.) Suitable components include 4,4'-bismaleimidodiphenylmethane and o,o'-diallyl bisphenol A, for example.

Suitable polycyanate ester resins can be prepared by combining cyanogen chloride or bromide with an alcohol or phenol. The preparation of such resins and their use in polycyclotrimerization to produce polycyanurates are described in U.S. Pat. No. 4,157,360 (Chung et al.) Representative examples of polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri-functional and higher functionality cyanate resins are also suitable.

Suitable resins may be (1) soluble in a reactive diluent and (2) reactive with the reactive diluent to form a copolymerized network. Known reactive diluents are suitable including, without limitation, styrene, alpha-methylstyrene, vinyl toluene, divinylbenzene, methyl methacrylate, diallyl phthalate, ethylene glycol dimethacrylate, hydroxyethyl methacrylate, hydroxyethyl acrylate and triallyl cyanurate.

Thermally-activated catalytic agents, e.g., Lewis acids and bases, tertiary amines, imidazoles, complexed Lewis acids, and organometallic compounds and salts, can be utilized in curing epoxy resins. Thermally-activated catalysts can generally be used in amounts ranging from about 0.05 to about 5 percent by weight, based on the amount of epoxy resin present in the curable resin composition.

N,N'-bismaleimide resins can be cured using diamine curing agents, such as those described in U.S. Pat. No. 3,562,223 (Bargain et al.) Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy)benzophenone, or o,o'-diallyl bisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

Filled resin made according to the process of the invention can be used to make articles by a variety of conventional processes, e.g., resin transfer molding, filament winding, tow placement, resin infusion processes, or traditional prepreg processes. Prepregs can be prepared by impregnating an array of fibers (or a fabric) with the filled resin (or with a volatile organic liquid-containing resin sol) and then layering the impregnated tape or fabric. The resulting prepreg can then be hardened or cured by application of heat, along with the application of pressure or vacuum (or both) to remove any trapped air. In other embodiments, the filled resins are hardened or cured by exposure to radiation, i.e., ultraviolet, e-beam, or the like.

EXAMPLES

Embodiments of the invention will be further described in the non-limiting examples that follow.
Analytical Methods
Analysis of Rheology:
Rheometric analyses of nanocomposite samples were conducted on an Ares Rheometric Scientific (TA instruments, New Castle, Del.) rheometer in parallel plate and in couvette modes depending on resin viscosity.
Gas Chromatography (GC) Analysis of Epoxy System Solvent Residuals:
Duplicate dilutions were prepared for each sample. Known masses of each sample, in the region of 120-180 mg of sample were brought to a volume of 10 mL with chloroform. Reference standards were created in chloroform for the concentration range of 0.1-1000 μg/mL. Samples and reference standards were aliquoted into vials via 0.2 μm PVDF syringe filters and analyzed according to the conditions below:
GC Instrument: Agilent 6890 GC, HP 7683 Injector
Column: Innowax 30 m×0.32 mm 1.0 um
Flow: 3.5 mL/min helium at constant flow
Injection: 1 μL split 1/60 [280° C.]
Oven: 60° C.@20° C./min to 300° C., hold 2 min
Detection flame ionization [300° C.].
General Procedure for Determining Fracture Toughness:
Fracture toughness ($K_{1C}$) was measured according to ASTM D 5045-99, except that a modified loading rate of 0.13 cm/minute (0.050 inches/minute) was used. A compact tension geometry was used, wherein the specimens had nominal dimensions of 3.18 cm by 3.05 cm by 0.64 cm. The following parameters were employed: W=2.54 cm; a=1.27 cm; B=0.64 cm. Measurements were made on between 6 and 10 samples for each resin tested. Average values for $K_{1C}$ were reported in units of MPa ($m^{1/2}$). Only those samples meeting the validity requirements of ASTM D 5045-99 were used in the calculations.
Procedure for Optical Properties Determination:
Various uncured, nanoparticle-containing resins were tested for optical transmission, clarity, and haze using a BYK GARDNER HAZE-GARD PLUS (catalog no. 4723, supplied by BYK Gardner, Silver Spring, Md.). The transmission, clarity, and haze levels were defined according to ASTM-D1003-00, titled "Standard Test Method for Haze and Luminous Transmittance for Transparent Plastics." The instrument was referenced against air during the measurements. Light transmission (T) measurements are provided as a percentage of transmission. Haze is the scattering of light by a specimen responsible for the reduction in contrast of objects viewed through it. Haze, H, is presented as the percentage of transmitted light that is scattered so that its direction deviates more than a specified angle from the direction of the incident beam. Clarity is evaluated using a ring detector and comparing the small-angle scattered light component to the specularly transmitted component.
For the transmission, haze, and clarity measurements of the uncured resins, a Teflon spacer was mounted between two clean glass microscope slides (1.0 mm/0.0407 inch average thickness), such that the spacer was outside the optical measurement area and created a gap of approximately 2.3 mm/0.09 inch (exact thickness were measured and recorded) into which individual samples of nanoparticle-containing resins were placed. Samples were sometimes heated before or after placement between the glass in order to obtain a sample as free of bubbles as possible. Clamps, also mounted outside the measurement area, were used to hold the glass pieces tightly to the spacer and ensure that the gap spacing was restricted to the thickness of the spacer. At least 5 individual measurements of the transmission, haze, and clarity were taken on each of the liquid resin samples. The average percent transmission, haze, and clarity are reported.
Equipment
Wiped Film Evaporator:
Unless otherwise indicated, experiments were conducted with a 1 $m^2$ Buss Filmtruder® counter current polymer processing machine equipped with a with a 25 hp drive. Heating was accomplished through use of steam and vapors were condensed using a 2.9 $m^2$ stainless steel condensers designed for low-pressure drop with integral jacket and level tank, rated for full vacuum and −38° C. Product flow to the WFE was controlled by a BP-6 Series High Flow Back Pressure Regulator (GO Regulator, Spartanburg, S.C.). The bottom of the WFE was equipped with a Maag Vacorex® pumps (Charlotte, N.C.) 45/45 jacketed polymer pump and drive. Vacuum was applied to the system through use of a Kinney® KD (Tuthill, Springfield, Mo.) and monitored using a Rosemount 3051 Pressure Transmitter (Rosemount, Chanhassen, Minn.).
LIST Discotherm B6 High Viscosity Processor:
Continuous devolitilizations for materials described in the Comparative Examples were performed in a LIST Discotherm B6 High Viscosity Processor, (commercially available from List AG, Acton, Mass.). The reactor has a total length of about 13.8 cm and an inside diameter of 2.8 cm consisting of a horizontal, cylindrical housing, and comprising 3 zones. Located in the center of the housing is a concentric main screw agitator shaft, having a diameter of about 6.35 cm. Mounted on the shaft (and extending perpendicular to the shaft) are disk elements with angled peripheral mixing-kneading bars (extending generally parallel to the shaft). Stationary hook-shaped bars mounted on the inside of the housing interact with and clean the shaft and disk elements as they rotate. The arrangement of the disk elements and mixing-kneading bars in concert with the stationary hook-shaped bars impart a substantially forward plug-flow movement to the material with minimal axial intermixing. Material is discharged from the LIST by a twin-screw discharge screw. The total volume in the reactor is 17.5 L, with a working volume of 12 L. The housing, shaft, and disk elements are heated via a hot oil heating system. The heat transfer area in the reactor is 0.67 m. Temperature is controlled and monitored in three locations within the reactor: (1) the reactor entrance zone (temperature $T_1$), (2) the reactor intermediate zone (temperature $T_2$) and (3) the reactor exit zone (temperature $T_3$). A variable speed motor drives the agitator shaft at speeds of 5 to 70 rpm and a maximum torque of 885 ft lbs (1200 Nm). A vacuum pump is attached to the reactor for vapor removal.
Materials
Materials used in the Examples are described in Table 1:

TABLE 1

| | |
|---|---|
| EPON 828 | A difunctional bisphenol A/epichlorohydrin derived liquid epoxy resin available under the trade designation EPON 828 from Hexion Specialty Chemicals, Houston, Texas |

TABLE 1-continued

| | |
|---|---|
| Nalco 2329 | A 41% solids by weight, aqueous, silica sol with an approximate particle size of 77 or 98 nm, available from Nalco Ondeo Nalco Chemical Company of Naperville, Ill. |
| PhTMS | Phenyltrimethoxysilane available from Alfa Aesar Ward Hill, MA. |
| MpOH | 1-methoxy-2-propanol available from Aldrich Chemicals, Milwaukee, WI. |
| Organosol 1 (Os 1) | A 25 wt % solution of phenyltrimethoxysilane/modified Nalco 2329 (ca. 95 nm) in 50/50 wt % methoxypropanol/water. |
| JAS | Jeffamine Sulfate, the reaction product of JEFFAMINE ® M-600 Polyetheramine with Propane sulfone as described in International Patent Application No. PCT/US2009/068359. |
| polyetheramine | A 600 molecular weight polypropylene glycol monoamine, with methoxyethyl termination at the other end, available from Huntsman Corporation, The Woodlands, Texas under the trade designation JEFFAMINE M-600 |
| Ethacure 100 | Ethacure 100 is a liquid aromatic amine, commercially available from Albemarle. Baton Rouge, LA. |
| Ultrafine, precipitated calcium carbonate | Ultrafine, precipitated calcium carbonate commercially available under the trade designation Socal 31 from Solvay Advanced Functional Minerals, Rheinberg, Germany/ |
| Epoxy Novolac Resin 1 (DEN 1) | D.E.N. 438 Epoxy Novolac Resin—a semi-solid reaction product of epichlorohydrin and phenol-formaldehyde novolac, commercially available from Dow Chemical, Midland, MI. |
| Epoxy Novolac Resin 2 (DEN 2) | D.E.N. 439 Epoxy Novolac Resin—a semi-solid reaction product of epichlorohydrin and phenol-formaldehyde novolac, commercially available from Dow Chemical, Midland, MI. |
| EPON 825 | Bisphenol A diglycidyl ether, commercially available from Hexion Specialty Chemicals, Houston Texas. |
| Organosol 2 (Os 2) | A mixture of Solcal 31 calcite (3664 g), Epon 825 (1566 g), JAS (185 g) and MEK (2327 g) was milled in a 600 ml Labstar media mill (Netzsch, Exton PA) using 0.5 mm zirconia beads for 90 minutes/batch at 3000 rpm consistent with procedures outlined in U.S. Provisional Patent Application serial no. 61/139,145 (attorney docket no. 64990US002), entitled "Nanocalcite Composites," |
| Organosol 3 (Os 3) | A 25 wt % Solution of phenyltrimethoxysilane/modified Nalco 2329K (ca. 98 nm) in 50/50 wt % methoxypropanol/water. |
| MX 257 | Kane Ace grade MX 257—a polybutadiene/acrylate core/shell rubber nanoparticle dispersed in EPON 828 epoxide at a particle concentration of 37 wt %, commercially available from Kaneka Texas Corporation. |
| Epon 862 | Bisphenol F diglycidyl ether, commercially available from Hexion Specialty Chemicals, Houston Texas. |
| Araldite MY 720 | tetreglycidyl-4,4'-diaminodiphenylmethane commercially available from Huntsman. |
| Araldite ECN 1280 | Epoxy cresol novolac with an epoxy equivalent weight of 2 and a functionality of 5.1. |
| Tactix 556 | A Dicyclopentadiene based epoxy commercially available from Huntsman. |

Comparative Examples 1-2

Suspensions of Os 1/epoxy were created with the components listed in Table 2. Each suspension was individually pumped (via a diaphragm pump) to the inlet of a LIST Discotherm B6 kneader, at rates consistent with a 45 minute residence time, into the first zone of the Discotherm B6 kneader. The speed of the main screw agitator shaft of the vacuum reactor was kept constant at approximately 34 rpm, while the discharge screw of the reactor was maintained at 47 rpm. Discharge of the material was facilitated by equipping the kneader's exit valve with a gear pump capable of pumping without loss of vacuum. Alternatively, the exit of the kneader can be equipped with a vacuum vessel capable of collecting the product under vacuum. Periodically, vacuum was released on the vessel and the vessel was removed and replaced with another vessel. The reactor was maintained at a vacuum of about 0.6 kPa (5 torr) at a temperature profile of T1=110° C.; T2=134° C.; and T3=143° C. A well-dispersed epoxy nanocomposite was provided having 60 wt % silica loading and a residual water and methoxypropanol level of less than 0.03 wt %.

A sample of CE1 was diluted to 30% silica by addition of EPON 828, mixed with Ethacure 100 (1.5 equivalents) and analyzed according to the General Procedure for Determining Fracture Toughness (see Table 3). This cured sample of possessed an initial $K_{1C}$ value of 1.30 characteristic of a nanosilica-filled, Epon-based epoxy nanoresin. CE2 was produced under identical processing conditions.

Examples 1-4, 6-9

Os 1 or Os 3/epoxy suspensions were created according to Table 2, mixing Os 1 or Os 3 solution, epoxy resin and MpOH in a 380 L kettle with agitation. The kettle was warmed to 80° C. and maintained at that temperature for 4 hrs. Materials were then cooled to room temperature in preparation for delivery to the wiped film evaporator (WFE). The suspension was metered to the top entrance of the WFE through use of a Zenith pump and came in contact with the WFE rotor set at a speed of 340 RPM. Vacuum was applied at a level of 30 torr. The suspension was subjected to the temperature and vacuum conditions listed in Table 4. After 10 minutes materials were isolated as a solvent-free, bluish-white, very thin and flowable material. As the material cooled it thickened to a sticky, non-flowing, high viscosity resin which was analyzed by TGA, GC and it's viscosity profile determined rheometrically (Table 3). Samples of Examples 1-4 and 6-9 were diluted to 30 wt % silica and mixed with Ethacure 100 (1.5 equivalents) and analyzed according to the General Procedure for Determining Fracture Toughness. Results are shown in Table 3.

Example 5

A mixture of Solcal 31 calcite (183 Kg), Epon 825 (78 Kg), JAS (9.25 Kg) and MEK (116.4 Kg) is milled in a 600 ml Labstar media mill (Netzsch, Exton Pa.) using 0.5 mm zirconia beads for 90 minutes/batch at 3000 rpm consistent with procedures outlined in U.S. Provisional Pat. Application Ser. No. 61/139,145, entitled "Nanocalcite Composites," Multiple passes are achieved through use of a Masterflex LS parastaltic pump (Cole-Parmer, Vernon Hills, N.J.), delivering the mixture to the mill at 250 ml/min.

A pre-milled mixture of Organosol 2 with 18% residual MEK was metered at a flow rate 6 g/minute to the top entrance of a LCI (Charlotte, N.C.) LabVap 0.25 sq. ft. WFE through use of vacuum and was placed in contact with the WFE rotor set at a speed of 1000 RPM. Vacuum was applied at a level of 30 torr. The suspension was subjected to a WFE jacket temperature of 150° C. After 10 minutes materials were isolated as a solvent-free, thin and flowable material, with a product exit temperature of 70° C., which was analyzed by TGA, GC and its viscosity profile was determined rheometrically (Table 3). High throughput rates are expected due to the small amount of MEK being removed. Additionally, a sample of Example 5 was diluted to 30% calcite by the addition of EPON 828, mixed with Ethacure 100 (1.5 equivalents) and analyzed according to the General Procedure for Determining Fracture Toughness. This cured sample will possess an initial $K_{1C}$ value of ca. 1.96 characteristic of a nanocalcite-filled, Epon-based epoxy nanoresin.

A comment should be made that the non thixotropic nature of these samples and the low viscosity nature suggests that less aggressive WFE systems like rolled film units may work for this resin/particle system.

TABLE 2

| Ex. | Os 1 (Kg) | Os 3 (Kg) | Mp-OH (Kg) | E-828 (Kg) | E-825 (Kg) | DEN 1 (Kg) | DEN 2 (Kg) | MX 257 (Kg) |
|---|---|---|---|---|---|---|---|---|
| CE1 | 227.3 | NA | 42.8 | 37.4 | NA | NA | NA | NA |
| CE2 | 49.5 | NA | 15.9 | NA | PA | 3 | 12 | NA |
| EX1 | 227.3 | NA | 42.8 | 37.4 | NA | NA | NA | NA |
| EX2 | 200.0 | NA | 37.7 | NA | 17.3 | 48.0 | 12.0 | NA |
| EX3 | 209.1 | NA | 39.7 | 17.5 | NA | 48.8 | 12.2 | NA |
| EX4 | NA | 109.1 | 20 | 27.3 | NA | NA | NA | 5.3 |
| EX6 | NA | 181.8 | 34 | NA | NA | 42.8 | 10.7 | NA |

| Ex. | Os 1 (Kg) | Os 3 (Kg) | Mp-OH (Kg) | ECN 1280 | E-862 | Tactix 556 | MY 720 (Kg) |
|---|---|---|---|---|---|---|---|
| EX7 | — | 110.9 | 20.6 | — | — | — | 33.6 |
| EX8 | — | 125.5 | 23.3 | 10.6 | 15.8 | | |
| EX9 | | 68.2 | 12.7 | | | 21.4 | |

PA = Resin post added to adjust the % Si to Ca. 38%.

TABLE 3

| Example | Final wt % Si in Resin | Residual solvent by GC (wt %) | Final Resin Viscosity -Pas at 71° C. | Final wt % CaCO$_3$ in Resin | K$_1$C at 30 wt % Si |
|---|---|---|---|---|---|
| CE1 | 60 | 0.03 | 19.9 | NA | 1.30 |
| CE2 | 38.2 | 0.02 | 30.0 | NA | 0.87 |
| 1 | 59.1 | 0 | 9.8 | NA | 1.31 |
| 2 | 38.1 | 0 | 14.2 | NA | 0.96 |
| 3 | 39.1 | 0 | 17.1 | NA | 0.97 |
| 4 | 48.2 | 0 | 4.7 | NA | 1.24 |
| 5 | NA | 0 | 7.1 | 70.0 | 1.96 |
| 6 | 44 | 0 | 120 | NA | 0.97 |
| 7 | 45 | 0 | 19.8 | NA | 0.76 |
| 8 | 53 | 0 | 47.8 | NA | 1.12 |
| 9 | 43 | 0 | 62.0 | NA | 0.76 |

TABLE 4

| Example | Sol Mixture Feed Rate (Kg/hr) | Product Output Rate (Kg/hr) | Distillate Rate (Kg/hr) | Temperature Profile (° C.) Zone 1 | Zone 2 | Zone 3 | Product Temperature (° C.) |
|---|---|---|---|---|---|---|---|
| EX1 | 68.8 | 19.8 | 49.0 | 105 | 140 | 110 | 95 |
| EX2 | 66.0 | 23.3 | 43.7 | 105 | 140 | 110 | 95 |
| EX3 | 68.8 | 19.8 | 49.0 | 105 | 140 | 110 | 95 |
| EX4 | 89.1 | 31.4 | 57.7 | 105 | 140 | 110 | 95 |
| EX5 | 68.0 | 47.6 | 20.4 | 150 | NA | NA | 90-160 |
| EX6 | 76.3 | 27.3 | 49 | 105 | 150 | 135 | 129 |
| EX7 | 60 | 22 | 38 | 105 | 105 | 140 | 90 |
| EX8 | 61.4 | 18.8 | 42.6 | 105 | 150 | 135 | 120 |
| EX9 | 53.7 | 21.4 | 32.3 | 105 | 105 | 140 | 114 |

Figure 4:
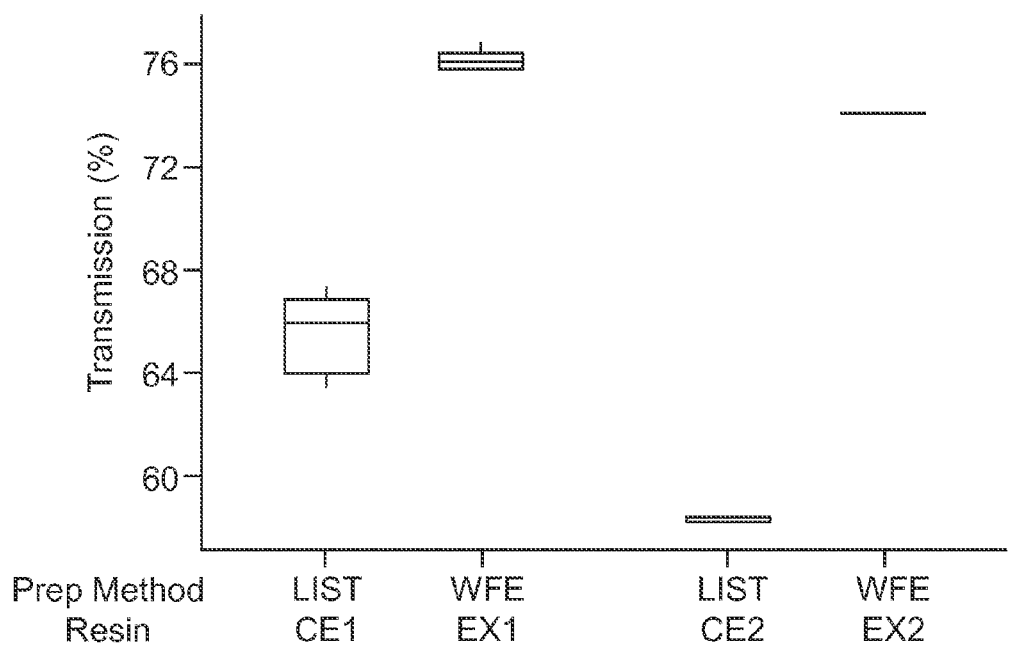
FIG. 4 is a graph of transmission (%) by resin type and process method for the materials made according to Examples 1 and 2 and Comparative Examples 1 and 2.
Figure 5:
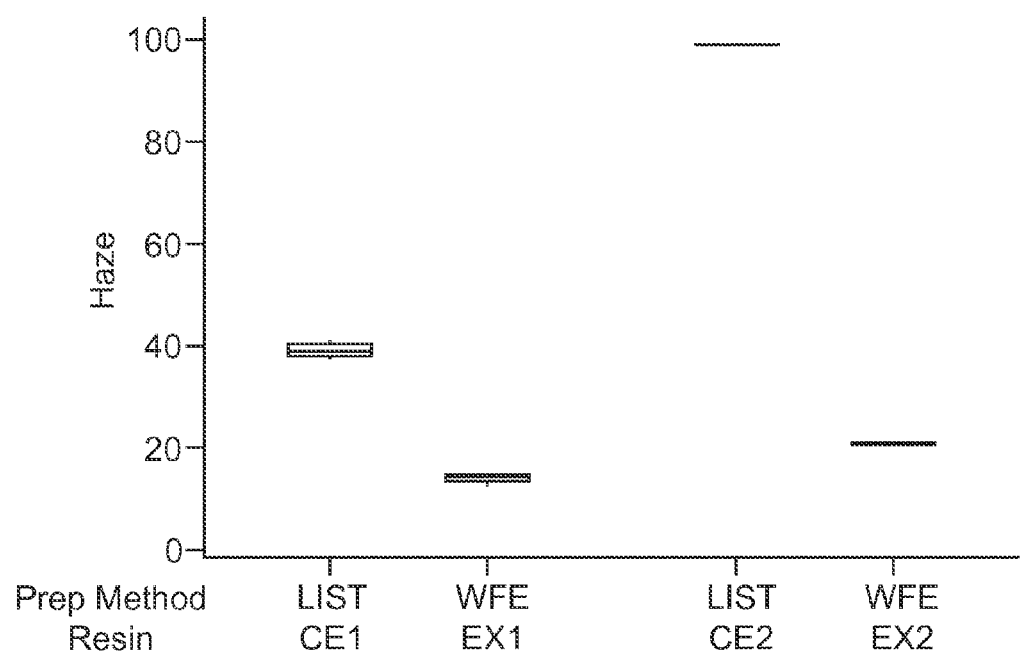
FIG. 5 is a graph of haze by resin type and process method for the materials made according to Examples 1 and 2 and Comparative Examples 1 and 2.
Figure 6:
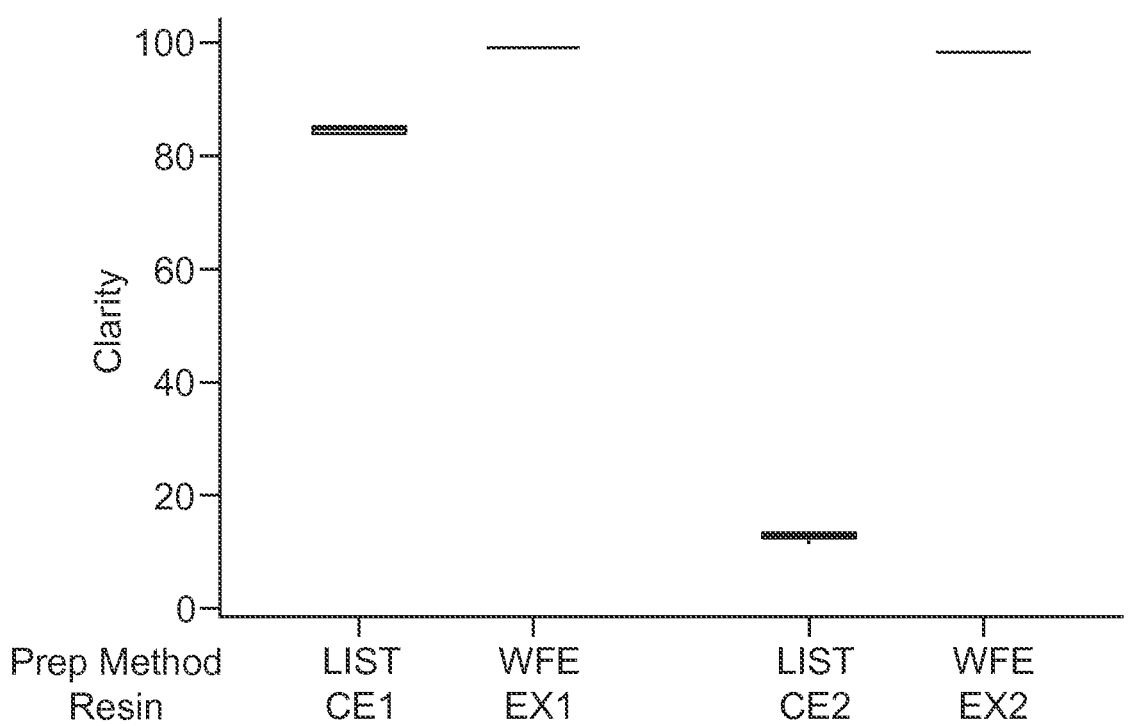
FIG. 6 is a graph of clarity measurements by resin type and process method for the materials made according to Examples 1 and 2 and Comparative Examples 1 and 2.

The optical properties of the resins in Examples 1-2 were compared to Comparative Example 1 and Comparative Example 2 generated through the use of the LIST kneader, and the results are set forth in Table 5, and in FIGS. 4-6.

TABLE 5

| EX | Resin | Process Method | T | H | C | Glass + sample thickness (cm) | Sample thickness (cm) |
|---|---|---|---|---|---|---|---|
| CE2 | Epon 828 | LIST | 58.3 | 99.1 | 12.9 | 0.23 | 0.03 |
| EX2 | Epon 828 | WFE | 74.1 | 20.5 | 98.8 | 0.24 | 0.03 |
| CE1 | 3M 3831 | LIST | 65.5 | 39.0 | 85.3 | 0.25 | 0.04 |
| EX1 | 3M 3831 | WFE | 76.1 | 13.8 | 99.7 | 0.24 | 0.03 |

Example 10

A filled resin including ceria in an acrylate matrix was prepared. As summarized in Table 6, a mixture of cerium oxide (average particle size of 120 nm), 1-methoxy-2-propanol, wetting agent, 2-hydroxyethyl methacrylate, trimethylolpropane triacrylate, phenoxy ethyl acrylate, 2-carboxyethyl acrylate phenothiazine was blended in a poly bottle and gently rolled for an hour until thoroughly mixed. This material was run through a 2 inch (5.08 cm) wiped film evaporator (Pope Scientific, Inc., Saukville, Wis.) using an external condenser. The conditions for the wiped film evaporator were: jacket 40° C.; condenser 2.0° C.; rotor speed @300 RPM with a vacuum of 15 mm Hg. A peristaltic pump was attached to the bottom of the evaporator's residue receiving flask to pump back to the evaporator's feed inlet for continuous recycle of the mixture through the evaporator until the water and methoxy propanol were removed to a level below 1%. Another peristaltic pump was set up to recycle the material from the bottom of the receiving flask to the top of the receiving flask so the ceria mixture would not settle out before the viscosity increased because of solvent removal and reached a level where settling was no longer an issue. Water and methoxy propanol were removed with no observed agglomeration, or polymerization of the acrylate mixture.

TABLE 6

| Material | Source | Amount (gm) |
|---|---|---|
| Cerium Oxide Slurry | Ferro Corporation SRS-1592 | 1500 |
| 1-Methoxy-2-Propanol | Alfa Aesar | 551.36 |
| Disperbyk D111 Wet Agent | BYK Chemie USA Inc. | 14.56 |
| 2-Hydroxyethyl Methacrylate | Monomer-Polymer & Dajac Lab Inc. | 6.44 |
| Trimethylolpropane Triacrylate | Sartomer SR351 | 120.92 |
| Phenoxy ethyl acrylate | Sartomer SR339 | 15.53 |
| 2-Carboxyethyl Acrylate | Bimax Inc. | 14.58 |
| Phenothiazine | Aldrich | 0.79 |

While embodiments of the invention have been described in sufficient detail, those skilled in the art will appreciate that changes or modifications, both foreseeable and unforeseen, may be made to the described embodiments without departing from the spirit or scope of the invention.

What is claimed:

1. A method of making a filled resin, comprising:
   providing a wiped film evaporator comprising an internal evaporator chamber maintained under vacuum conditions and an internal chamber wall maintained at an elevated temperature;
   introducing solvent-borne particles and organic matrix into the internal chamber; and
   compounding the solvent-borne particles and the organic matrix in the internal evaporator chamber by forming a thin film against the internal chamber wall, the thin film comprised of organic matrix and particles, the vacuum conditions and elevated temperature being sufficient to remove solvent from the particles and organic matrix to provide the filled resin;
   wherein, less than about 10% of the particles in the filled resin are agglomerated; and
   wherein, the organic matrix comprises a thermoset or an ethylenically-unsaturated crosslinkable resin.

2. The method of claim 1, wherein the process further comprises functionalizing the particles prior to compounding, and wherein functionalizing the particles comprises treating the particles with surface-modifying agent to provide functionalized solvent-borne particles.

3. The method of claim 2, wherein the particles have an average thickness up to about 30 micrometers.

4. The method of claim 2, wherein the particles comprise nanoparticles having an average thickness less than about 500 nm.

5. The method of claim 4, wherein the nanoparticles comprise functionalized silicon dioxide.

6. The method of claim 4, wherein the nanoparticles comprise functionalized calcium carbonate.

7. The method of claim 1, further comprising pre-mixing the solvent-borne particles and the organic matrix prior to introducing particles and organic matrix into the internal chamber of the wiped film evaporator.

8. The method of claim 1, further comprising:
   providing a feedstock by combining
   (i) untreated particles,
   (ii) surface-modifying agent reactive with the particles, and
   (iii) solvent; and
   reacting the untreated particles with the surface-modifying agent in the feedstock to provide solvent-borne functionalized particles; and
   combining the solvent-borne functionalized particles and the organic matrix to provide a mixture;
   wherein, introducing solvent-borne particles and organic matrix into the internal chamber comprises directing the mixture into the internal chamber of the wiped film evaporator.

9. The method of claim 8, wherein providing a feedstock further comprises adding rubber nano-domains.

10. The method of claim 9, wherein the rubber nano-domains comprise core-shell rubber nanoparticles, the shell of the nanoparticles having a glass transition temperature at least 50° C. and the core having a glass transition temperature no greater than −20° C.

11. The method of claim 10, wherein the shell comprises a material selected from the group consisting of an acrylic polymer, an acrylic copolymer, a styrenic polymer, and a styrenic copolymer.

12. The method of claim 1, wherein the particles comprise inorganic materials selected from the group consisting of metal, oxide, sulfide, carbonate, antimonide, inorganic salt, nitride, metal-coated particle and combinations of two or more of the foregoing.

13. The method of claim 1, wherein the particles comprise organic materials selected from the group consisting of carbon black, organic pigments and combinations thereof.

14. The method of claim 1 wherein the particles comprise inorganic oxides selected from the group consisting of zirconium dioxide—$ZrO_2$, aluminum oxide—$Al_2O_3$, cerium (IV) oxide—$CeO_2$, titanium dioxide—$TiO_2$, iron(II) oxide—FeO, iron(II,III) oxide—$Fe_3O_4$, iron(III) oxide—$Fe_2O_3$, zinc oxide—ZnO, silicon dioxide (silica)—$SiO_2$, antimony trioxide—$Sb_2O_3$, boron oxide—$B_2O_3$, boron suboxide—$B_6O$, bismuth(III) oxide—$Bi_2O_3$, copper(I) oxide—$Cu_2O$, copper (II) oxide—CuO, chromium(III) oxide—$Cr_2O_3$, iron(II) oxide—FeO, iron (III) oxide—$Fe_2O_3$, magnesium oxide—MgO, manganese(IV) oxide (manganese dioxide—$MnO_2$) and combinations of two or more of the foregoing.

15. The method of claim 1 wherein the particles comprise inorganic sulfides selected from the group consisting of copper(I) sulfide, copper(II) sulfide, zinc sulfide and combinations of two or more of the foregoing.

16. The method of claim 1 wherein the particles comprise material selected from the group consisting of indium phosphide, aluminum phosphide, brass, metal coated glass, boron carbide, boron nitride, calcium carbide, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate, lithium sulfate, magnesium carbonate, magnesium phosphate, magnesium sulfate, manganese(II) sulfate monohydrate, manganese(II) phosphate, nickel(II) carbonate, nickel(II) hydroxide, nickel(II) nitrate, silicon dioxide, titanium dioxide, zinc carbonate, zinc oxide, zinc sulfate and combinations of two or more of the foregoing.

17. The method of claim 1 wherein the particles comprise metal oxides selected from the group consisting of titania, alumina, zirconia, vanadia, chromia, iron oxide, antimony oxide, tin oxide and mixtures of two or more of the foregoing.

18. The method of claim 17 wherein the metal oxide particles are functionalized with organosilane surface-modifying agent(s) selected from the group consisting of polyethylene glycol(trimethoxy)silane, phenyltrimethoxysilane, 3-methacryloxypropyltrimethoxysilane and combinations of two or more of the foregoing.

19. The method of claim 1 wherein the organic matrix comprises epoxy resin.

20. The method of claim 1 wherein the organic matrix comprises ethylenically-unsaturated crosslinkable resin.

* * * * *

UNITED STATES PATENT AND TRADEMARK OFFICE
CERTIFICATE OF CORRECTION

PATENT NO. : 8,541,485 B2
APPLICATION NO. : 13/263283
DATED : September 24, 2013
INVENTOR(S) : James M Nelson et al.

It is certified that error appears in the above-identified patent and that said Letters Patent is hereby corrected as shown below:

In the Specifications

Column 7
Line 39, delete "greater then" and insert -- greater than --

Column 14

Lines 1-6, delete " 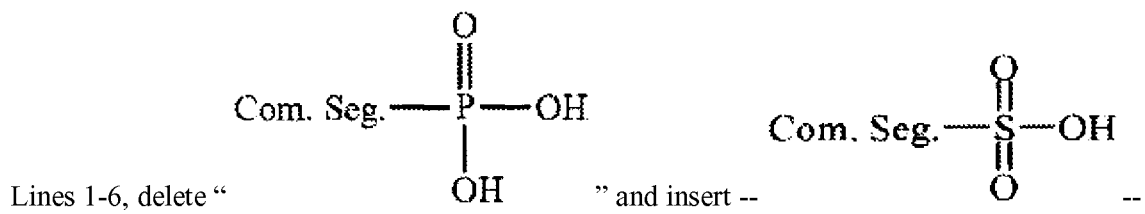 " and insert -- --

Line 26, delete "compatiblizing" and insert -- compatibilizing --

Line 27, delete "compatiblizing" and insert -- compatibilizing --

Column 16
Lines 10-11, Delete "tripentaerythirol," and insert -- tripentaerythritol, --

Line 44, delete "alicylic," and insert -- alicyclic, --

Column 17
Line 9, delete "benz ene," and insert -- benzene, --

Column 20
Line 32 (approx.), delete "devolitilizations" and insert -- devolatilizations --

Columns 21-22 (Table 1 – continued)
Line 16, delete "Albermarle." and insert -- Albemarle. --

Signed and Sealed this
Fourth Day of February, 2014

Michelle K. Lee
*Deputy Director of the United States Patent and Trademark Office*

Column 23

Line 10 (approx.), delete "parastaltic pump" and insert -- peristaltic pump --